(12) United States Patent
Sharp

(10) Patent No.: US 8,472,015 B1
(45) Date of Patent: Jun. 25, 2013

(54) FAN BEAM RESECTION USING DIRECT LINEAR TRANSFORM AND SINGULAR VALUE DECOMPOSITION

(75) Inventor: Kevin Andrew Ian Sharp, Christchurch (NZ)

(73) Assignee: Trimble Navigation Ltd, Sunnyvale, CA (US)

( * ) Notice: Subject to any disclaimer, the term of this patent is extended or adjusted under 35 U.S.C. 154(b) by 361 days.

(21) Appl. No.: 12/962,651

(22) Filed: Dec. 7, 2010

(51) Int. Cl.
*G01C 1/00* (2006.01)

(52) U.S. Cl.
USPC .......................................................... 356/138

(58) Field of Classification Search
USPC .......................................................... 356/138
See application file for complete search history.

(56) References Cited

U.S. PATENT DOCUMENTS

| | | | |
|---|---|---|---|
| 4,676,634 A | 6/1987 | Petersen | |
| 6,198,528 B1* | 3/2001 | Maynard | 356/141.1 |
| 6,473,980 B2 | 11/2002 | Ripingill, Jr. | |
| 6,545,751 B2* | 4/2003 | Beliveau et al. | 356/141.4 |
| 6,870,608 B2 | 3/2005 | Detweiler | |
| 7,012,237 B1 | 3/2006 | Ake | |
| 7,064,819 B2 | 6/2006 | Detweiler | |
| 7,323,673 B1 | 1/2008 | Ake | |
| 7,409,312 B2 | 8/2008 | Conner | |
| 7,749,216 B2 | 7/2010 | Sumiya | |
| 7,764,365 B2 | 7/2010 | Nichols | |
| 2012/0050752 A1* | 3/2012 | Novak et al. | 356/623 |

FOREIGN PATENT DOCUMENTS

WO  WO2009154625  12/2009

OTHER PUBLICATIONS

Richard Hartley and Andrew Zisserman, "Multiple View Geometry in computer vision", 2003, pp. 88, Cambridge University Press.
Y.I. Abdel-Aziz and H.M. Karara, "Direct Linear Transform From Comparator Coordinates Into Object Space Coordinates in Close-Range Photogrammetry", presented in Symposium on Close Range Photogrammetry, 1971.

\* cited by examiner

*Primary Examiner* — Roy M Punnoose
(74) *Attorney, Agent, or Firm* — Boris G. Tankhilevich

(57) ABSTRACT

A method of resection-based positioning of a rotating fan beam transmitter is provided. The fan beam is rotating about a single axis of rotation. The rotating fan beam is being detected in a detector space including a detector cluster further including a plurality of detectors. The single axis of rotation intersects a reference plane in the detector space at an arbitrary angle. The method comprises: (A) detecting the rotating fan beam by using a plurality of detectors; (B) processing a set of detection signals to obtain a set of time-strike tags; and (C) determining the axis of rotation of the rotating fan beam in the detector space by using the set of time-strike tags. At least minimum number of detectors is stricken by the rotating fan beam. Each stricken detector generates a detection signal having a time-strike tag corresponding to a timing coordinate of the strike by the rotating fan beam.

38 Claims, 3 Drawing Sheets

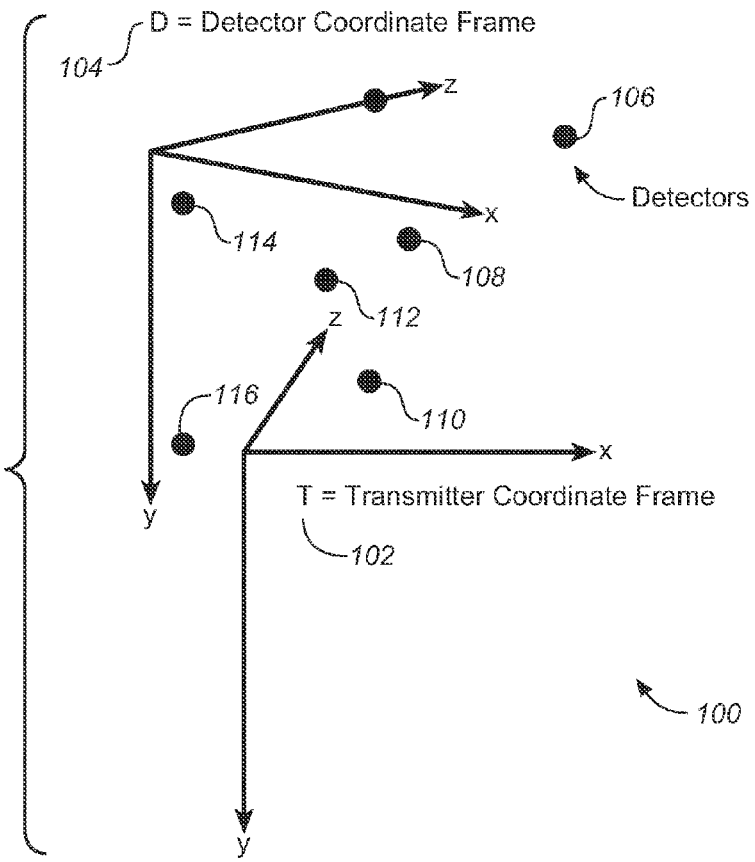

First Measurement of Fan-Beam Axis in Detector Space

Second Measurement of Fan-Beam Axis in Detector Space

FAN BEAM RESECTION USING DIRECT LINEAR TRANSFORM AND SINGULAR VALUE DECOMPOSITION

TECHNICAL FIELD

The technology relates to the field of resection-based positioning.

BACKGROUND

The apparatus and method of the fan-beam resection problem are disclosed in the PCT application No PCT/US2008/067464, Pub. No WO/2009/154625, publication Date-Dec. 23, 2009, international filing date-Jun. 19, 2008 entitled "POSITIONING DEVICE AND METHOD FOR DETECTING A LASER BEAM", by SCHUMACHER, Lars; (DE) and CONNER, Robert, G.; (US), hereinafter referred to as PCT '464.

The technology disclosed in PCT '464 relates to a positioning device and method for detecting light of fan shaped laser beam, as well as to a positioning system comprising the device and to a light emitting device emitting the fan shaped laser beam, which enable to find a spot of a laser beam easier and quicker. The positioning device comprises a detector for detecting light of a fan shaped laser beam rotating around a propagation axis with a direction of rotation and having two detector elements arranged in a known spatial relation for outputting a detection signal when irradiated; and a position determining unit to obtain a first set of detection signals from the detector elements, determine a first time relation between the detection signals of the first set, and determine a positional relation between the detector and the propagation axis based on the first time relation. PCT '464 is incorporated in the present patent application.

However, the solution offered in PCT '464 assumes that the detectors are arranged in a plane and the axis of the fan-beam laser is perpendicular to the plane. This limits the utility of the idea.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method of resection-based positioning of a rotating fan beam transmitter is provided. The fan beam is rotating about a single axis of rotation. The rotating fan beam is being detected in a detector space including a detector cluster further including a plurality of detectors. The single axis of rotation intersects a reference plane in the detector space at an arbitrary angle.

The method comprises: (A) detecting the rotating fan beam by using a plurality of detectors; (B) processing a set of detection signals to obtain a set of time-strike tags; and (C) determining the axis of rotation of the rotating fan beam in the detector space by using the set of time-strike tags. At least minimum number of detectors is stricken by the rotating fan beam. Each stricken detector generates a detection signal having a time-strike tag corresponding to a timing coordinate of the strike by the rotating fan beam.

DESCRIPTION OF THE DRAWINGS

The accompanying drawings, which are incorporated in and form a part of this specification, illustrate embodiments of the technology and, together with the description, serve to explain the principles below:

FIG. 2 illustrates the geometry of the fan-beam resection problem in accordance with an embodiment of the present technology.

FIG. 3 shows orthographic projection of the detector coordinates onto the XY plane of the fan beam transmitter in accordance with an embodiment of the present technology.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Resection and its related method, intersection, are used in surveying as well as in general land navigation (including inshore marine navigation using shore-based landmarks). Both methods involve taking azimuths or bearings to two or more objects, then drawing lines of position along those recorded bearings or azimuths. When intersecting lines of position are used to fix the position of an unmapped feature or point by fixing its position relative to two (or more) mapped or known points, the method is known as intersection. At each known point (hill, lighthouse, etc.), the navigator measures the bearing to the same unmapped target, drawing a line on the map from each known position to the target. The target is located where the lines intersect on the map. In earlier times, the intersection method was used by forest agencies and others using specialized alidades to plot the (unknown) location of an observed forest fire from two or more mapped (known) locations, such as forest fire observer towers.

The reverse of the intersection technique is appropriately termed resection. Resection simply reverses the intersection process by using crossed back bearings, where the navigator's position is the unknown.[5] Two or more bearings to mapped, known points are taken; their resultant lines of position drawn from those points to where they intersect will reveal the navigator's location.

Figure 1:
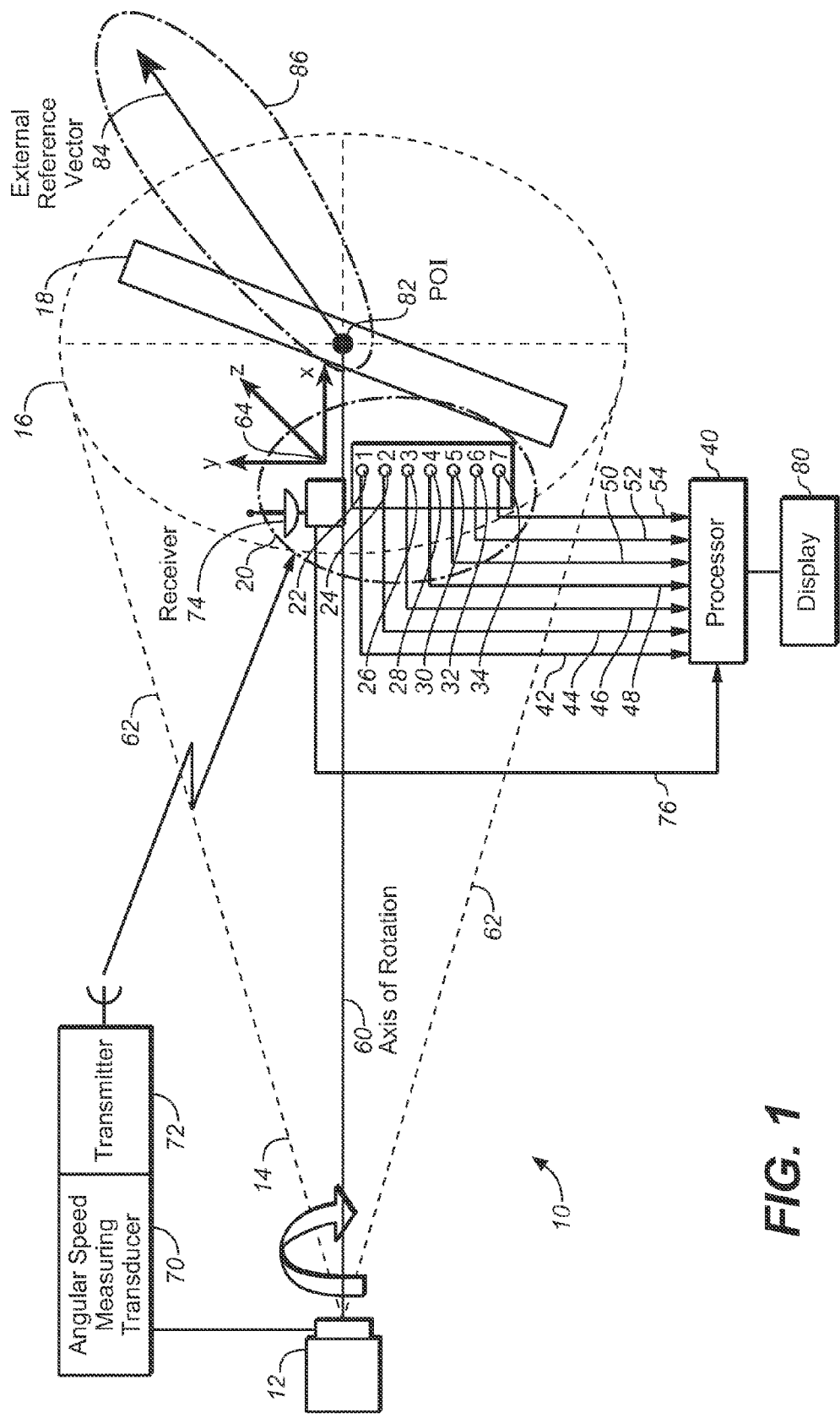
FIG. 1 depicts an apparatus for resection-based position determination of a rotating fan beam transmitter in accordance with an embodiment of the present technology.

FIG. 1 depicts an apparatus 10 for resection-based position determination of a rotating fan beam transmitter 12 in accordance with an embodiment of the present technology. In an embodiment of the present technology, the apparatus 10 for resection-based position determination of a rotating fan beam transmitter 12 comprises a detector space 20 further comprising a cluster of detectors (22, 24, 26, 28, 30, 32, and-34) and a processor 40 configured to determine an axis of rotation 60 of the rotating fan beam 18 by using a set of detection signals.

In an embodiment of the present technology, a single axis of rotation 60 of the fan beam 18 intersects a reference plane 64 in the detector space 20 at an arbitrary angle.

In an embodiment of the present technology, the rotating fan beam transmitter 12 is selected from the group consisting of: a visible rotating fan beam laser transmitter; an infra-red rotating fan beam laser transmitter; and a ultra-violet rotating fan beam laser transmitter.

In an embodiment of the present technology, a visible rotating fan beam laser transmitter can be implemented by installation of a penta prism and a cylinder lens to a laser transmitter creates a fan beam in addition to the horizontal and vertical beams.

In an embodiment of the present technology, an infrared rotating fan beam laser transmitter can be implemented by using an Infrared laser transmitter disclosed in the U.S. Pat. No. 6,473,980. More specifically, an invisible infrared laser beam is emitted from a plurality of red LEDs mounted on a planar printed circuit board, or PCB, that is used to mechanically support and electrically connect LED elements by using electronic components using conductive pathways, tracks or signal traces etched from copper sheets laminated onto a non-conductive substrate.

In an embodiment of the present technology, an ultraviolet rotating fan beam laser transmitter can be implemented by using a laser source employed in a corneal surgery apparatus (as it is disclosed in U.S. Pat. No. 7,749,216.). The apparatus of '216 includes a laser beam emitting measurement light with a wide wavelength band, a beam splitter dividing the light, a second optical system irradiating the cornea with one divided light, a movable reference mirror on an optical path of the other divided light and a photo-detector at a position photo-receiving interference light of the measurement light reflected by the cornea and the mirror, which obtains a three-dimensional corneal shape based on an interference light image, a unit obtaining corneal ablation data based on obtained corneal shape data, and a unit controlling the ablation unit based on the ablation data.

In an embodiment of the present technology, referring still to FIG. 1, the further discussion will be focused the visible laser beam transmitter 12.

In an embodiment of the present technology, referring still to FIG. 1, the beam 18 rotates about a single axis of rotation 60 at a constant angular rotation speed.

In an embodiment of the present technology, referring still to FIG. 1, the beam 18 rotates about a single axis of rotation 60 at a variable angular rotation speed. In this embodiment, the apparatus 10 further includes an angular speed measuring transducer 70 (disclosed in the U.S. Pat. No. 7,412,886) that is configured to substantially continuously measure variable angular rotation speed of the fan beam 18 at the location of the fan beam transmitter 12.

In an embodiment of the present technology, referring still to FIG. 1, wherein the beam 18 rotates about the single axis of rotation 60 at variable angular rotation speed, the apparatus 10 further includes a transmitter 72 (a person skilful in the art knows how to implement such a transmitter) configured to substantially continuously transmit the substantially continuously measured value of the variable angular rotation speed to at least minimum number of detectors in the detector cluster 20 by using a receiver 64.

In an embodiment of the present technology, referring still to FIG. 1, the detector cluster 20 includes at least seven detectors (22-, 24, 26, 28, 30, 32 and 34). Please see discussion below.

In an embodiment of the present technology, referring still to FIG. 1, the detector cluster 20 includes at least six detectors selected among detectors (22-, 24, 26, 28, 30, 32 and 34). Please see discussion below.

In an embodiment of the present technology, referring still to FIG. 1, the detector cluster 20 includes at least five detectors selected among detectors (22-, 24, 26, 28, 30, 32 and 34). Please see discussion below.

The arrangement of detectors (22-, 24, 26, 28, 30, 32 and 34) and position of detector space 20 given FIG. 1 is arbitrary and given only for exemplary purpose. In other embodiments of the present technology numerous alternative arrangements of detectors and position of detector space 20 are possible.

In an embodiment of the present technology, detectors (22-34) can be implemented by using any of the following devices:

a. Photosensors or photodetectors that are sensors of light or other electromagnetic energy. For example: optical detectors, which are mostly quantum devices in which an individual photon produces a discrete effect.

b. Photoresistors or Light Dependent Resistors (LDR) which change resistance according to light intensity. For example: photovoltaic cells or solar cells which produce a voltage and supply an electric current when illuminated.

c. Photodiodes which can operate in photovoltaic mode or photoconductive mode. For example: Light Emitting Diodes (LEDs) that are reverse-biased to act as photodiodes.

In an embodiment of the present technology, referring still to FIG. 1, wherein at least minimum number (5, 6, or 7, please see discussion below) of detectors (22-34) are stricken by the rotating fan beam 18, each stricken detector (22-34) generates a corresponding detection signal (42-54) having a time-strike tag corresponding to a timing coordinate of the strike by the rotating fan beam 18.

In an embodiment of the present technology, referring still to FIG. 1, a processor 40 is configured to process the set of time-strike tags transmitted by detection signals (42-54).

In an embodiment of the present technology, referring still to FIG. 1, wherein the rotating fan beam 18 rotates at a constant angular rotating speed, wherein at least minimum number (5, 6, or 7) of detectors (22-34) are stricken by the rotating fan beam 18, the processor 40 is configured to process the set of time-strike tags and configured to determine a set of angles; each angle being proportional to a corresponding strike-time tag.

In an embodiment of the present technology, referring still to FIG. 1, wherein the fan beam 18 rotates at a variable angular rotating speed, a receiver 74 is configured to substantially continuously receive a measured variable value of the variable angular rotation speed of the rotating fan beam 18 from transmitter 72, and is configured to send the measured variable value of the variable angular rotation speed of the rotating fan beam 18 by using a signal 76 to the processor 40.

In an embodiment of the present technology, referring still to FIG. 1, wherein the fan beam 18 rotates at a variable angular rotating speed, and wherein at least minimum number of said detectors (5-7) are stricken by the rotating fan beam 18, and wherein each stricken detector (22-34) generates a corresponding detection signal (42-54) having a time-strike tag corresponding to a timing coordinate of a strike by the rotating fan beam 18, the processor configured to determine a set of angles corresponding to the set of strike-time tags by using the measured variable value of the variable angular rotation speed of the rotating fan beam 18.

In an embodiment of the present technology, by using a set of time-strike tags, each time-strike tag corresponding to a timing coordinate of a strike by the rotating fan beam 18, the processor 40 is configured to determine the axis of rotation 60 of the rotating fan beam 18 in the detector space 20.

In an embodiment of the present technology, referring still to FIG. 1, by using a set of time-strike tags, each time-strike tag corresponding to a timing coordinate of a strike by the rotating fan beam 18, the processor 40 is configured to determine a point of intersection (POI) 82 of the fan beam axis of rotation 60 and a reference plane 64 in the detector space 20.

In an embodiment of the present technology, referring still to FIG. 1, the processor 40 is configured to determine 2D position and orientation of the 20 detector cluster in the reference plane 86 relative to a coordinate frame with an origin defined by said point of intersection (POI) 82 and an orientation defined by an external reference vector 84. The external reference vector is selected from the group consisting of: a gravitational vector; a vector of local Earth Magnetic field; and a local vector defined by a gyroscope (not shown).

In an embodiment of the present technology, the 2D position and orientation of the 20 detector cluster are displayed on the display 80.

In an embodiment of the present technology, referring still to FIG. 1, the processor 40 is configured to determine 3D rotation coordinates of the detector cluster 20 with respect to a coordinate frame 86 defined by the external reference vector 84 and the fan beam axis of rotation 60.

In an embodiment of the present technology, referring still to FIG. 1, the processor 40 is configured to determine 3D rotation coordinates of the detector cluster 20 with respect to a coordinate frame 86 defined by the external reference vector 84, by the fan beam axis of rotation 60, and by a specific plane in said detector space (not shown), wherein the specific plane is coplanar to a plane in World Coordinate System.

In an embodiment of the present technology, FIG. 2 depicts the geometry 100 that helps to understand how to actually solve the fan-beam resection problem wherein the fan beam 18 intersects the detector space 20 at an arbitrary angle.

The transmitter (12 of FIG. 1) and the detector (20 of FIG. 1) are considered to each have their own coordinate system T 102 and D 104 respectively, as depicted in FIG. 2. The detector coordinate frame, D104, includes a number of detectors (106, 108, 110, 112, 114, 116, and 118) that are dispersed through the broad area, each having known 3D coordinates in the detector coordinate frame D 104.

The transmitter coordinate frame, T 102, can, by way of arbitrary convention, be defined so that the z-axis represents the axis of the fan-beam laser 12 (of FIG. 1).

At first one need to cover some basics on which the present technology is based.

In mathematics, projective geometry is the study of geometric properties that are invariant under projective transformations. This means that, compared to elementary geometry, projective geometry has a different setting, projective space, and a selective set of basic geometric concepts. The basic intuitions are that projective space has more points than Euclidean space, in a given dimension, and that geometric transformations are permitted that move the extra points (called "points at infinity") to traditional points, and vice versa.

The properties that are meaningful in projective geometry are those that are respected by this new idea of transformation, which is more radical in its effects than can be expressed by a transformation matrix and translations (the affine transformations); the first issue for geometers is what kind of geometric language would be adequate to the novel situation. It is not possible to talk about angles in projective geometry as it is in Euclidean geometry, because angle is an example of a concept not invariant under projective transformations. One source for projective geometry was indeed the theory of perspective. Another difference from elementary geometry is the way in which parallel lines can be said to meet in a point at infinity, once the concept is translated into projective geometry's terms. Again this notion has an intuitive basis, such as railway tracks meeting at the horizon in a perspective drawing.

In essence, a projective geometry may be thought of as an extension of Euclidean geometry in which the "direction" of each line is subsumed within the line as an extra "point", and in which a "horizon" of directions corresponding to coplanar lines is regarded as a "line". Thus, two parallel lines will meet on a horizon line in virtue of their possessing the same direction.

Idealized directions are referred to as points at infinity, while idealized horizons are referred to as lines at infinity. In turn, all these lines lie in the plane at infinity. However, infinity is a metric concept, so a purely projective geometry does not single out any points, lines or plane in this regard—those at infinity are treated just like any others.

There are many projective geometries, which may be divided into discrete and continuous: a discrete geometry comprises a set of points, which may or may not be finite in number, while a continuous geometry has infinitely many points with no gaps in between.

Homography is a concept in the mathematical science of geometry. A homography is an invertible transformation from the real projective plane to the projective plane that maps straight lines to straight lines. Synonyms are collineation, projective transformation, and projectivity, though "collineation" is also used more generally.

Formally, a projective transformation is a transformation used in projective geometry: it is the composition of a pair of perspective projections. It describes what happens to the perceived positions of observed objects when the point of view of the observer changes.

Projective transformations do not preserve sizes or angles but do preserve incidence and cross-ratio: two properties which are important in projective geometry. Projectivities form a group.

Homogeneous coordinates are used, because matrix multiplication cannot directly perform the division required for perspective projection.

Given:

$$p_a = \begin{bmatrix} x_a \\ y_a \\ 1 \end{bmatrix}, p'_b = \begin{bmatrix} w'x_b \\ w'y_b \\ w' \end{bmatrix}, H_{ab} = \begin{bmatrix} h_{11} & h_{12} & h_{13} \\ h_{21} & h_{22} & h_{23} \\ h_{31} & h_{32} & h_{33} \end{bmatrix} \quad \text{(Eqs. 1)}$$

Then:

$$p'_b = H_{ab} p_a \quad \text{(Eq. 2)}$$

where:

$$H_{ba} = H_{ab}^{-1}. \quad \text{(Eq. 3)}$$

Also:

$$p_b = p'_b/w' = \begin{bmatrix} x_b \\ y_b \\ 1 \end{bmatrix} \quad \text{(Eq. 4)}$$

Direct linear transformation (DLT) is an algorithm which solves a set of variables from a set of similarity relations:

$$x_k \propto A y_k \text{ for } k=1,\ldots,N \quad \text{(Eq. 5)}$$

where $x_k$ and $y_k$ are known vectors, $\propto$ denotes equality up to an unknown scalar multiplication, and A is a matrix (or linear transformation) which contains the unknowns to be solved. This type of relation appears frequently in projective geometry. Practical examples include the relation between 3D points in a scene and their projection onto the image plane of a pinhole camera, and homographies.

An ordinary linear equation $$x_k = A y_k \text{ for } k=1,\ldots,N \quad \text{(Eq. 6)}$$

can be solved, for example, by rewriting it as a matrix equation $$X = AY \quad \text{(Eq. 7)}$$

where matrices X and Y contain the vectors $x_k$ and $y_k$ in their respective columns.

Given that there exists a unique solution, it is given by $$A = XY^T(YY^T)^{-1}. \quad \text{(Eq. 8)}$$

Solutions can also be described in the case that the equations are over or under determined.

What makes the direct linear transformation problem distinct from the above standard case is the fact that the left and right sides of the defining equation can differ by an unknown multiplicative factor which is dependent on k. As a consequence, A cannot be computed as in the standard case. Instead, the similarity relations are rewritten as proper linear homogeneous equations which then can be solved by a standard method. The combination of rewriting the similarity equations as homogeneous linear equations and solving them by standard methods is referred to as a Direct Linear Transformation algorithm or DLT algorithm.

Abdel-Aziz and Karara applied the DLT to camera resection, but Hartley and Zisserman do describe it. Please, see Y. I. Abdel-Aziz and H. M. Karara, "Direct Linear Transform From Comparator Coordinates Into Object Space Coordinates in Close-Range Photogrammetry, presented in," in *Symposium on Close Range Photogrammetry*, 1971; Richard Hartley and Andrew Zisserman (2003). *Multiple View Geometry in computer vision*; Cambridge University Press, hereinafter referred to as (Hartley and Zisserman 2003).

Camera resection solves a set of linear constraints to determine the coordinate transform between the world frame (containing known 3D points) and the camera frame (containing corresponding image points). Each constraint arises from the fact that for each point the 3D line segment from the perspective centre of the camera to the image point, and the line segment from the perspective centre to world point will be co-linear i.e. they have the same direction, but different lengths. This is expressed algebraically as the cross product of two vectors being zero.

The present technology is concerned with the application of the Direct Linear Transform algorithm to the solution of the fan-beam resection problem.

This can be most easily understood by thinking of the transmitter being analogous to the camera above. It differs from the camera in two respects. Firstly, the detector is stimulated by the transmitter where the photo-sensitive elements on the camera sensor are stimulated by light from the 3D world points. This has the effect that the transform is calculated at the detector coordinate frame D 104 (of FIG. 2), rather than at the transmitter coordinate frame T 102 (of FIG. 2). Otherwise the analogy holds.

Secondly, one cannot determine the 2D location on the XY plane of the transmitter onto which the detector projects. One can only constrain the projection to a line 142 through the origin 144 of the transmitter coordinate system 140, as shown in FIG. 3. This means that whereas camera resection uses a cross product constraint, fan-beam resection uses the equivalent constraint in two dimensions. This is simply the constraint that a point should lay on a known line through the origin. Because the point may be anywhere along this line one can consider the projection to be orthographic rather than the perspective projection in the camera resection case. Thus, FIG. 3 depicts an orthographic projection of the detector coordinates onto the XY plane of the transmitter.

If one considers the problem as taking a set of homogeneous 3D coordinates (the detector coordinates in their own coordinate space) and a set of homogenous 1D coordinates (a normalised vector corresponding to the rotation of the fan beam about its axis with respect to an arbitrary origin) then $$p = X_{D \rightarrow T} P \quad \text{(Eq. 9)}$$

In the (Eq. 9), P is a 4 by n matrix representing homogenous 3D coordinates of each of the detectors in the detector coordinate frame.

In the (Eq. 9), p is a 2 by n matrix representing homogeneous 1D coordinates of each of the detectors in the transmitter coordinate frame. This is a unit vector representing the rotation of the fan-beam.

In the (Eq. 9), $X_{D \rightarrow T}$ is the coordinate transform from detector coordinates to transmitter coordinates. It is a 2 by 4 matrix because it maps homogenous 3D coordinates (the detector coordinates) to homogenous 1D coordinates (unit vectors representing angles).

(Eq. 9) is a projective relationship, so equality here doesn't mean the vector elements are equal. What it really means is that the unsigned direction of the vectors is equal. This system can be solved using a variant of the Direct Linear Transform (Hartley and Zisserman 2003, page 88).

Indeed, the coordinate transform $X_{D \rightarrow T}$ can be thought of as a rotation and translation from the detector coordinate frame D to the 3d transmitter coordinate frame T', followed by an orthographic projection onto the XY plane of the transmitter coordinate frame. The 2d non-homogenous coordinates can then be considered as 1d homogenous coordinates of the unit vector representing the rotation of the fan beam.

Thus, the transform from the detector coordinate frame D to the 3d transmitter coordinate frame can be represented as ...

$$X_{D \rightarrow T'} = \begin{bmatrix} r_1 & r_2 & r_3 & t_1 \\ r_4 & r_5 & r_6 & t_2 \\ r_7 & r_8 & r_9 & t_3 \\ 0 & 0 & 0 & 1 \end{bmatrix} \quad \text{(Eq. 10)}$$

where the r elements are due to rotation and the t elements are due to translation. (Hartley and Zisserman 2003).

Orthographic projection to a non-homogenous coordinate simply discards the last two elements of the vector, so $$X_{D \to T} = \begin{bmatrix} 1 & 0 & 0 & 0 \\ 0 & 1 & 0 & 0 \end{bmatrix} X_{D \to T'} = \begin{bmatrix} r_1 & r_2 & r_3 & t_1 \\ r_4 & r_5 & r_6 & t_2 \end{bmatrix} \quad \text{(Eq. 11)}$$

For each correspondence $p_i=[\sin(\theta_i), \cos(\theta_i)]^T$ and $P_i$ one can derive one linear equation from the fact that the exterior product of p and $X_{D \to T}P$ is zero. That is where "=" now represents actual equality (rather than projective equality)

$$\frac{\sin(\theta_i)}{\cos(\theta_i)} = \frac{[r_1, r_2, r_3, t_1] \cdot P_i}{[r_4, r_5, r_6, t_7] \cdot P_i} \quad \text{(Eq. 12)}$$

(Eq. 12) can be rearranged as $$[-\cos(\theta_i)\vec{P}_i^T, \sin(\theta_i)\vec{P}_i^T][r1,r2,r3,t1,r4,r5,r6,t2]^T = 0 \quad \text{(Eq. 13)}$$

If one represents this as . . .

$$\vec{C}_i[r1,r2,r3,t1,r4,r5,r6,r2]^T = 0 \quad \text{(Eq. 14)}$$

Then, for seven such equations (corresponding to 7 detectors) one can write $$\begin{bmatrix} \vec{C}_1 \\ \vdots \\ \vec{C}_7 \end{bmatrix} \cdot [r1, r2, r3, t1, r4, r5, r6, t2]^T = 0 \quad \text{(Eq. 15)}$$

This equation (Eq. 15) can be solved up to an unknown scale by a method of Singular Value Decomposition (SVD). The scale may then be recovered up to an unknown sign from the knowledge that [r1, r2, r3] is a unit vector. Indeed, in linear algebra, the singular value decomposition (SVD) is an important factorization of a rectangular real or complex matrix, with many applications in signal processing and statistics.

Suppose M is an m×n matrix whose entries come from the field K, which is either the field of real numbers or the field of complex numbers. Then there exists a factorization of the form $$M=U\Sigma V^*, \quad \text{(Eq. 16)}$$

where U is an m×m unitary matrix over K, the matrix Σ is an m×n diagonal matrix with nonnegative real numbers on the diagonal, and V*, an n×n unitary matrix over K, denotes the conjugate transpose of V.

Such a factorization is called the singular value decomposition of M. The diagonal entries $\Sigma_{i,i}$ of F is known as the singular values of M. A common convention is to order the singular values in descending order. In this case, the diagonal matrix Σ is uniquely determined by M (though the matrices U and V are not).

In the singular value decomposition of matrix M (of Eq. 16), the columns of V form a set of orthonormal "input" or "analysing" basis vector directions for M. These are the eigenvectors of M*M.

The columns of U (of Eq. 16) form a set of orthonormal "output" basis vector directions for M. These are the eigenvectors of MM*.

The diagonal values in matrix Σ (of Eq. 16) are the singular values, which can be thought of as scalar "gain controls" by which each corresponding input is multiplied to give a corresponding output. These are the square roots of the eigenvalues of MM* and M*M that correspond with the same columns in U and V.

The Singular Value Decomposition (SVD) can be used for the purposes of the present technology to solve a set of homogeneous linear equations.

Indeed, q set of homogeneous linear equations can be written as $$Ax=0 \quad \text{(Eq. 17)}$$

for a matrix A and vector x. A typical situation is that A is known and a non-zero x is to be determined which satisfies the equation. Such an x belongs to A's null space and is sometimes called a (right) null vector of A. x can be characterized as a right singular vector corresponding to a singular value of A that is zero. This observation means that if A is a square matrix and has no vanishing singular value the equation has no non-zero x as a solution. It also means that if there are several vanishing singular values, any linear combination of the corresponding right singular vectors is a valid solution. Analogously to the definition of a (right) null vector, a non-zero x satisfying $$x^*A=0, \quad \text{(Eq. 18)}$$

with x* denoting the conjugate transpose of x, is called a left null vector of A.

Applying the method of Singular Value Decomposition (SVD) to (Eq. 15) is analogous to applying Direct Linear Transform for camera resection problem. This gives $x_{D \to T}$ up to an unknown scale, s. If the axis of the fan beam intersects the z=0 plane at [x,y] then $$\begin{bmatrix} x \\ y \end{bmatrix} = -\begin{bmatrix} r_1 & r_2 \\ r_4 & r_5 \end{bmatrix}^{-1} \begin{bmatrix} t_1 \\ t_2 \end{bmatrix} = -\begin{bmatrix} sr_1 & sr_2 \\ sr_4 & sr_5 \end{bmatrix}^{-1} \begin{bmatrix} st_1 \\ st_2 \end{bmatrix} \quad \text{(Eq. 19)}$$

In an embodiment of the present technology, the 3D rotation can be recovered. But, since s can only be determined up to an ambiguity in sign; each of the rotation vectors will have an ambiguity in sign. Therefore some assumption on the range of rotation should be made.

The system can be solved for fewer than seven points—six or five. There are no unique solutions with fewer than five points. The method requires that Singular Value Decomposition is used to find the null space of the under constrained linear equations. There are then two non-linear constraints in H that can be used to reduce the solution to a 1 dimensional subspace. The six point solution is a simple quadratic; the five points is the solution of two quadratics in two variables.

In an embodiment of the present technology, when working with the noisy data is involved, it's important to normalise the coordinate spaces, as explained in detail in (Hartley and Zisserman 2003).

There are a number of degenerate geometries of a detector space (20 of FIG. 1) that cannot be solved (by any method). For example, all the points in P and the unknown point $[x, y]^T$ project onto a conic on the z=0 plane. The detectors should be arranged to avoid this.

Even with the planar resection method (i.e. when the fan beam axis is normal to the wall) there is degeneracy when all the points lie on a circle. For this reason four detectors in the shape of a square is a bad choice.

Figure 4A:
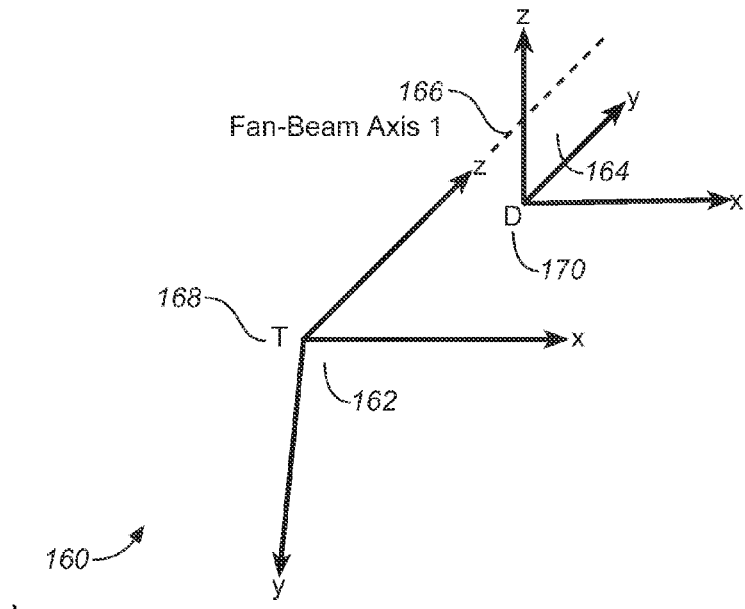
FIG. 4A illustrates the geometry of the first measurement of fan beam axis in a detector space for the first fan beam axis in accordance with an embodiment of the present technology.
Figure 4B:
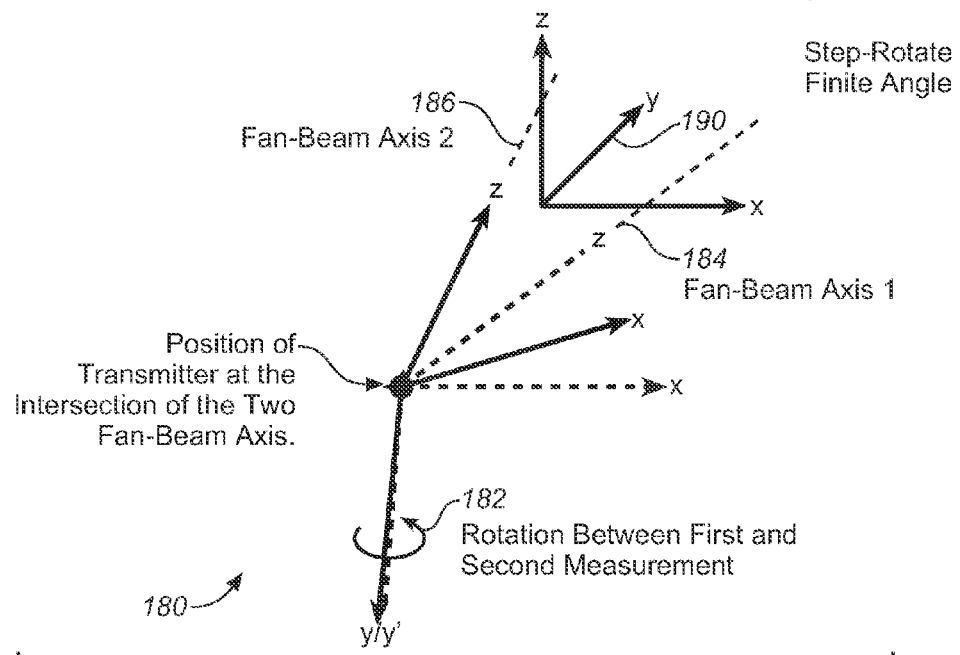
FIG. 4B shows the geometry of the second measurement of fan beam axis in a detector space for the second fan beam axis in accordance with an embodiment of the present technology.

In an embodiment of the present technology, a method of resection-based positioning of a rotating fan beam transmitter can be used to determine 3D rotation coordinates of the fan beam transmitter with respect to the detector space, as illustrated in FIGS. 4A and 4B.

In an embodiment of the present technology, as illustrated in FIG. 4A, at the first step a measurement is made of a first location of the first axis of rotation 166 of the rotating fan beam transmitter 168 in the reference plane 164 located in the detector space D 170.

In an embodiment of the present technology, as illustrated in FIG. 4B, at the next step, an origin position of the fan beam transmitter is rotated about a reference axis 182 for a fixed angle; wherein the fan beam starts rotating about a second axis 186; wherein the second axis of rotation 186 intersects the reference plane 190 in the detector space at an arbitrary angle. At this point, at the next step, a measurement of a second location of the second axis of rotation 186 of the rotating fan beam transmitter is performed in the reference plane 190 located in the detector space. The 3D rotation coordinates of the fan beam transmitter with respect to the detector space are determined by using cross-product of the first fan beam axis of rotation 184 and the second fan beam axis of rotation 186.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method of resection-based positioning of a rotating fan beam transmitter; said fan beam rotating about a single axis of rotation; said rotating fan beam being detected in a detector space; said detector space including a detector cluster further including a plurality of detectors; said single axis of rotation intersecting a reference plane in said detector space at an arbitrary angle; said method comprising:

(A) detecting said rotating fan beam by using said plurality of detectors; wherein at least minimum number of said detectors are stricken by said rotating fan beam; wherein each said stricken detector generates a detection signal having a time-strike tag corresponding to a timing coordinate of said strike by said rotating fan beam;

(B) processing said set of detection signals to obtain said set of time-strike tags; and (C) determining said axis of rotation of said rotating fan beam in said detector space by using said set of time-strike tags.

2. The method of claim 1 further comprising:

(D) determining a point of intersection (POI) of said fan beam axis of rotation and said reference plane in said detector space.

3. The method of claim 1 further comprising:

(E) using an external reference vector to determine 2D position and orientation of said detector cluster in said reference plane relative to a coordinate frame with an origin defined by said point of intersection (POI) in said detector space and an orientation defined by said external reference vector.

4. The method of claim 3, wherein said step (E) further comprises:

(E1) selecting said external reference vector from the group consisting of: a gravitational vector; a vector of local Earth Magnetic field; and a local vector defined by a gyroscope.

5. The method of claim 1 further comprising:

(F) determining 3D rotation coordinates of said detector cluster with respect to a coordinate frame defined by said external reference vector and said fan beam axis of rotation.

6. The method of claim 5 further comprising:

(G) determining 3D position coordinates of said detector cluster with respect to a coordinate frame; said coordinate frame being defined by said external reference vector, by said fan beam axis of rotation, and by a specific plane in said detector space; said specific plane being coplanar to a plane in World Coordinate System.

7. The method of claim 1, wherein said step (A) further comprises:

(A1) selecting said rotating fan beam transmitter from the group consisting of: a visible rotating fan beam laser transmitter; an infra-red rotating fan beam laser transmitter; and a ultra-violet rotating fan beam laser transmitter.

8. The method of claim 1, wherein said step (A) further comprises:

(A2) rotating said fan beam at a constant angular rotating speed.

9. The method of claim 1, wherein said step (A) further comprises:

(A3) rotating said fan beam at a variable angular rotating speed.

10. The method of claim 9, wherein said step (A3) further comprises:
- (A3, 1) substantially continuously measuring said variable angular rotation speed at a location of said rotating fan beam transmitter.

11. The method of claim 10, wherein said step (A3, 1) further comprises:
- (A3, 1, 1) substantially continuously transmitting a value of said substantially continuously measured variable angular rotation speed to at least minimum number of said detectors.

12. The method of claim 1, wherein said step (A) further comprises:
- (A4) selecting a detector cluster including at least seven detectors.

13. The method of claim 1, wherein said step (A) further comprises:
- (A5) selecting a detector cluster including at least six detectors.

14. The method of claim 1, wherein said step (A) further comprises:
- (A6) selecting a detector cluster including at least five detectors.

15. The method of claim 1, wherein said step (B) further comprises:
- (B1) determining a set of angles if said rotating fan beam rotates at said constant angular rotating speed, each said angle being proportional to a corresponding strike-time tag.

16. The method of claim 1, wherein said step (B) further comprises:
- (B2) determining a set of angles corresponding to said set of strike-time tags, wherein said rotating fan beam rotates at a variable angular rotating speed.

17. The method of claim 16 wherein said step (B2) further comprises:
- (B2, 1) substantially continuously receiving measured variable value of said variable angular rotation speed of said rotating fan beam by at least minimum number of said stricken detectors; and
- (B2, 2) using said substantially continuously measured variable angular rotation speed value of said of said rotating fan beam to determine set of strike-time tags at a location of each said stricken detector element.

18. A method of resection-based positioning of a rotating fan beam transmitter; said fan beam rotating about a first axis of rotation; said rotating fan beam being detected in a static detector space; said static detector space including a detector cluster further including a plurality of detectors; said detector cluster being static in World Coordinate System; said method comprising:
- (A) making a measurement of a first location of said first axis of rotation of said rotating fan beam transmitter in said reference plane located in said detector space;
- (B) rotating an origin position of said fan beam transmitter about a reference axis for a fixed angle; wherein said fan beam starts rotating about a second axis; wherein said second axis of rotation intersects said reference plane in said detector space at an arbitrary angle; and
- (C) making a measurement of a second location of said second axis of rotation of said rotating fan beam transmitter in said reference plane located in said detector space.

19. The method of claim 18, wherein said step (A) further comprises:
- (A1) detecting said rotating fan beam by using said plurality of detectors; wherein at least minimum number of said detectors are stricken by said rotating fan beam; wherein each said stricken detector generates a detection signal having a time-strike tag corresponding to a timing coordinate of said strike by said rotating fan beam;
- (A2) processing said set of detection signals to obtain said set of time-strike tags; and
- (A3) determining said first axis of rotation of said rotating fan beam in said detector space by using said set of time-strike tags.

20. The method of claim 18, wherein said step (C) further comprises:
- (C1) detecting said rotating fan beam by using said plurality of detectors; wherein at least minimum number of said detectors are stricken by said rotating fan beam; wherein each said stricken detector generates a detection signal having a time-strike tag corresponding to a timing coordinate of said strike by said rotating fan beam;
- (C2) processing said set of detection signals to obtain said set of time-strike tags;
- (C3) determining said second axis of rotation of said rotating fan beam in said detector space by using said set of time-strike tags; and
- (C4) determining 3D rotation coordinates of said fan beam transmitter with respect to said detector space by using cross-product of said first fan beam axis of rotation and said second fan beam axis of rotation.

21. An apparatus for resection-based position determination of a rotating fan beam transmitter comprising:
- (A) a means for detecting a rotating fan beam; said fan beam rotating about a single axis of rotation; said means for detecting said rotating fan beam configured to detect a set of detection signals;
- (B) a means for processing said set of detection signals; and
- (C) a means for determining said axis of rotation of said rotating fan beam by using said set of detection signals.

22. The apparatus of claim 21, wherein said means (A) further comprises:
- (A1) a detector space; said detector space further comprising a cluster of detectors; said cluster of detectors further including a plurality of detectors; said single axis of rotation of said fan beam intersecting a reference plane in said detector space at an arbitrary angle.

23. The apparatus of claim 21, wherein said means (A) further comprises:
- (A2) said rotating fan beam transmitter selected from the group consisting of: a visible rotating fan beam laser transmitter; an infra-red rotating fan beam laser transmitter; and a ultra-violet rotating fan beam laser transmitter.

24. The apparatus of claim 21, said fan beam rotating about a single axis of rotation at a variable speed; wherein said means (A) further comprises:
- (A3) a means for substantially continuously measuring said variable angular rotation speed at a location of said fan beam transmitter.

25. The apparatus of claim 24, wherein said means (A3) further comprises:
- (A3, 1) an angular speed measuring transducer.

26. The apparatus of claim 21, said fan beam rotating about a single axis of rotation at a variable speed; wherein said means (A) further comprises:
- (A4) a transmitter configured to substantially continuously transmit said variable value of said substantially continuously measured variable angular rotation speed to at least minimum number of said detectors.

27. The apparatus of claim 21; wherein said means (A) further comprises:
- (A5) detectors cluster including at least seven detectors.

28. The apparatus of claim 21; wherein said means (A) further comprises:
- (A6) a detectors cluster including at least six detectors.

29. The apparatus of claim 21; wherein said means (A) further comprises:
- (A7) a detector clusters including at least five detectors.

30. The apparatus of claim 21; wherein at least minimum number of said detectors are stricken by said rotating fan beam; wherein each said stricken detector generates a detection signal having a time-strike tag corresponding to a timing coordinate of said strike by said rotating fan beam; wherein said means (B) further comprises:
- (B1) a processor configured to process said set of time-strike tags.

31. The apparatus of claim 21; wherein said rotating fan beam rotates at a constant angular rotating speed; wherein at least minimum number of said detectors are stricken by said rotating fan beam; wherein each said stricken detector generates a detection signal having a time-strike tag corresponding to a timing coordinate of said strike by said rotating fan beam; wherein said means (B) further comprises:
- (B2) a processor configured to process said set of time-strike tags and configured to determine a set of angles; each said angle being proportional to a corresponding strike-time tag.

32. The apparatus of claim 21; wherein said rotating fan beam rotates at a variable angular rotating speed; wherein at least minimum number of said detectors are stricken by said rotating fan beam; wherein each said stricken detector generates a detection signal having a time-strike tag corresponding to a timing coordinate of said strike by said rotating fan beam; wherein said means (B) further comprises:
- (B3) a processor configured to determine said set of angles corresponding to said set of strike-time tags.

33. The apparatus of claim 32; wherein said means (B3) further comprises:
- (B3, 1) a receiver configured to substantially continuously receive measured variable value of said variable angular rotation speed of said rotating fan beam.

34. The apparatus of claim 21; wherein said rotating fan beam rotates at a variable angular rotating speed; wherein at least minimum number of said detectors are stricken by said rotating fan beam; wherein each said stricken detector generates a detection signal having a time-strike tag corresponding to a timing coordinate of said strike by said rotating fan beam; wherein said means (C) further comprises:
- (C1) a processor configured to determine said axis of rotation of said rotating fan beam in said detector space by using said set of time-strike tags.

35. The apparatus of claim 21 further comprising:
- (D) a processor configured to determine a point of intersection (POI) of said fan beam axis of rotation and said reference plane in said detector space.

36. The apparatus of claim 21 further comprising:
- (E) a processor configured to determine 2D position and orientation of said detector cluster in said reference plane relative to a coordinate frame with an origin defined by said point of intersection (POI) in said detector space and an orientation defined by an external reference vector; wherein said external reference vector is selected from the group consisting of: a gravitational vector; a vector of local Earth Magnetic field; and a local vector defined by a gyroscope.

37. The apparatus of claim 21 further comprising:
- (F) a processor configured to determine 3D rotation coordinates of said detector cluster with respect to a coordinate frame defined by said external reference vector and said fan beam axis of rotation.

38. The apparatus of claim 21 further comprising:
- (G) a processor configured to determine 3D position coordinates of said detector cluster with respect to a coordinate frame; said coordinate frame being defined by said external reference vector, by said fan beam axis of rotation, and by a specific plane in said detector space; said specific plane being coplanar to a plane in World Coordinate System.

* * * * *